July 14, 1936.  H. P. HAYDEN  2,047,778
INSULATED PIPE
Filed Aug. 14, 1931

INVENTOR
Harold P. Hayden
BY
ATTORNEYS.

WITNESS:

Patented July 14, 1936

2,047,778

UNITED STATES PATENT OFFICE 2,047,778

INSULATED PIPE

Harold P. Hayden, Woodbridge, N. J., assignor to The Barber Asphalt Company, Philadelphia, Pa., a corporation of West Virginia Application August 14, 1931, Serial No. 556,990

6 Claims. (Cl. 154—44)

This invention relates to insulated pipe and while it is adaptable for various uses, it will be found more especially advantageous for use in the formation of steam lines and in particular where such lines extend out of doors, as from one building to another.

As is well known, steam lines for the transmission of steam from one place to another are in wide and general use. Such steam lines are frequently carried out of doors and for substantial distances both above and below the ground. Steam lines extending for any substantial distance are universally insulated for the conservation of heat, the insulation usually comprising a covering of non-conducting material, as for example, asbestos. Where a steam line extends out of doors, whether above or below ground, the insulating covering, if it be not protected in some way, is subjected to rapid deterioration from, for example, the action of the elements, etc. and is also subject to deterioration from the action of steam which may leak from the line at various points due to, for example, imperfect joints.

Various means have been provided for the protection of the insulating covering on steam lines and among other means used, the insulating covering has been protected by wrapping with prepared roofing, such as, for example, comprises an asphalt saturated and coated felt. The protection afforded by a wrapping of prepared roofing is excellent except for the fact that the prepared roofing, impregnated and coated with asphalt, will not withstand the action of leaking steam, which, due to its high temperature, renders the asphalt fluid, and has the effect of causing the formation of blisters in the wrapping. Further, the efficiency of prepared roofing from the standpoint of protection for the insulating covering is reduced by the action of the heat of the sun, which softens the asphalt, and by the ultra-violet ray component of sunlight.

Now it is the object of this invention to provide an insulated pipe the insulating covering of which will be adequately protected through the medium of a protective covering of a character such as to resist the action of escaping steam and/or the deleterious effect of the heat and ultra-violet component of the sun.

The insulated pipe in accordance with this invention comprises a pipe of any usual type covered with any usual or known form of insulating material such, for example, as asbestos and which may be of any usual or known structure, as for example, cellular, the insulating material being in turn protected by a wrapping of prepared roofing comprising, for example, an asphalt impregnated and coated felt in the form of a strip, either or both surfaces of which is covered with a metallic foil, as for example, aluminum foil, tin foil, or the like.

In the insulated pipe structure contemplated by this invention the protective covering or wrapping may, as has been indicated, have either or both of its surfaces coated with metallic foil. Where the wrapping has but one surface protected by means of a coating of metallic foil, the wrapping may be applied to the insulating covering with the foiled surface either in or out. Where the protective wrapping is applied with the foiled surface in; i. e. against the insulating covering, the foiled surface will act to protect the asphalt impregnated and coated felt from the deleterious effects of any steam which may escape from the line, the insulating covering being protected from, for example, the elements by the body of the wrapping. On the other hand, where the wrapping is applied with the foiled surface out, the foiled surface will protect the body of the wrapping from the deleterious effects of the elements and in particular from the heat and the ultra-violet light of the sun due to the reflecting quality of the foil. As will be obvious, where both surfaces of the protective wrapping are foiled, the wrapping will be protected from the deleterious effects of any steam which may escape and from the elements, particularly the heat and ultra-violet light of the sun.

Having indicated in a general way the details of my invention, I will proceed to a detailed description of a preferred embodiment thereof with reference to the accompanying drawing in which.

Referring to the several figures A indicates a pipe which may be of any known size, gauge and material. B indicates an insulating covering which may be of any known material and form. For example, the insulating covering B may be of the cellular type formed of asbestos and adapted to be applied in sections to the pipe.

C indicates a protective wrapping comprising a strip of, for example, ordinary roofing material composed of asphalt impregnated and coated felt. Either one or both surfaces of the strip C are foiled by the application thereto of a metallic foil D, such, for example, as aluminum foil, tin foil, or the like. The foil is preferably light in color and of a material which will maintain a relative light color under weathering, in order that it will provide the strip C with a reflective surface.

Figure 1:
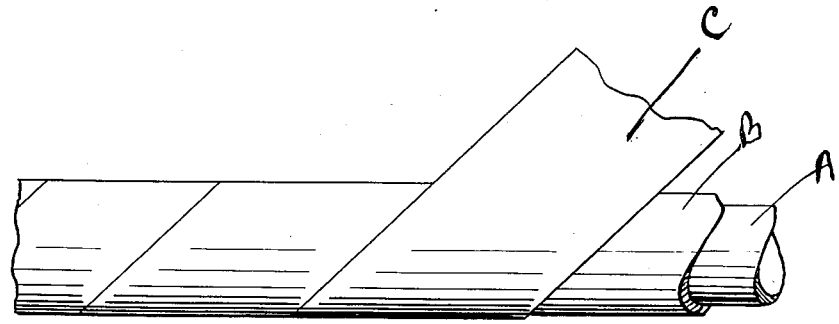
Figure 1 illustrates a section of insulated pipe embodying my invention.
Figure 2:
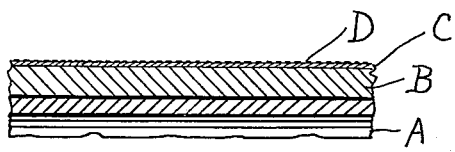
Figure 2 is a sectional view showing an embodiment of this invention where the protective wrapping is applied with the foiled surface out.
Figure 3:
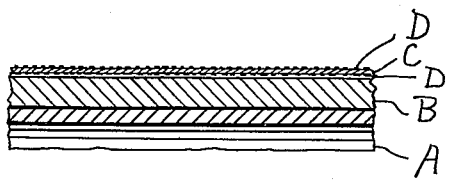
Figure 3 is a view similar to Figure 2, the protective wrapping having both its surfaces foiled.
Figure 4:
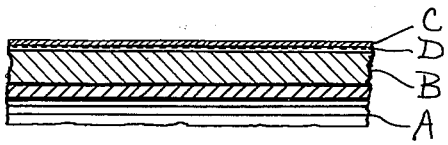
Figure 4 is a view similar to Figures 2 and 3, the protective wrapping having its inner surface foiled.

Referring now more particularly to Figures 2, 3, and 4, it will be noted that Figure 2 shows the protective wrapping C having one surface foiled, which is applied to the insulating covering spirally, as shown in Figure 1, with the foiled surface out.

In Figure 3 both surfaces of the protective wrapping C are foiled, while in Figure 4 the protective wrapping C having one surface foiled, is applied with the foiled surface in or against the insulating covering B.

In the case of the structure illustrated in Figure 2, where the protective wrapping C having one surface foiled, is applied with the foiled surface out, the body of the protective wrapping C will be protected from the action of the elements by the foil and especially from the deleterious effects of the ultra-violet light component of sunlight and from the sun's heat, since the foil will reflect or deflect the ultra-violet light and the heat and prevent the deleterious effects thereof on the body of the protective wrapping C. Avoidance of the absorption of heat into the protective wrapping C will obviously prevent the deleterious effect of heat upon the asphalt in the protective wrapping.

In the structure illustrated by Figure 4 where the protective wrapping C is foiled on one surface and is applied with the foiled surface in, the foiled surface will act to protect the body of the wrapping C from the action of any steam which may leak from the pipe A at a joint or otherwise.

In the structure shown in Figure 3 where both surfaces of the wrapping C are foiled, the body of the wrapping is protected from leaking steam on the one hand and from the effect of the elements, and especially heat of the sun, on the other.

It will now be noted that in accordance with this invention an insulated pipe structure is provided of a character such that the insulating material is effectively protected by a protective wrapping which in turn is protected from the deleterious effects of escaping steam and/or from the elements and particularly ultra-violet light and the heat of the sun so that it will remain over a long period at a high state of efficiency.

It will be understood that the essence of this invention involves the provision of a protective wrapping one or both surfaces of which are covered or coated with metallic foil, the use of any form of pipe insulating covering or type of protective covering being contemplated as within the scope of this invention.

It will be understood that the protective covering may be of any desired material, but will preferably comprise an absorptive material, as for example, a felted fibrous material impregnated and, if desired, also coated with bitumen, as for example, asphalt, either native or still residue, tar, or the like.

What I claim and desire to protect by Letters Patent is:

1. In combination, a length of pipe, a covering of insulating material surrounding said pipe, a flexible protective wrapping about said insulating material, said protective wrapping comprising a bitumen impregnated felt and having both of its surfaces coated with aluminum foil.

2. In combination, a length of pipe, a covering of insulating material surrounding said pipe, a protective wrapping about said insulating material, said protective wrapping comprising a strip of felted fibrous material impregnated with asphalt and having a surface coated with metallic foil, the protective wrapping being applied with its foiled surface against the insulating material.

3. In combination, a length of pipe, a covering of insulating material surrounding said pipe, a flexible protective wrapping about said insulating material, said protective wrapping comprising a strip of felted fibrous material impregnated with asphalt and having its surfaces coated with metallic foil.

4. In combination, a length of pipe, a covering of insulating material surrounding said pipe, a flexible bituminated protective wrapping about said insulating material, said protective wrapping having both of its surfaces coated with metallic foil.

5. In combination, a length of pipe, a covering of insulating material surrounding said pipe, a protective wrapping about said insulating material, said protective wrapping comprising a strip of fibrous material impregnated with asphalt and having a surface coated with metallic foil, the protective coating being applied with its foiled surface against the insulating material.

6. In combination, a length of pipe, a covering of insulating material surrounding said pipe, a protective wrapping about said insulating material, said protective wrapping comprising a strip of fibrous material impregnated with asphalt and having its surfaces coated with metallic foil.

HAROLD P. HAYDEN.